(12) United States Patent
Sheu

(10) Patent No.: US 9,057,851 B2
(45) Date of Patent: Jun. 16, 2015

(54) OPTICAL COUPLING ELEMENT AND OPTICAL FIBER CONNECTOR USING SAME

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 50 days.

(21) Appl. No.: 13/917,650

(22) Filed: Jun. 14, 2013

(65) Prior Publication Data

US 2014/0270641 A1 Sep. 18, 2014

(30) Foreign Application Priority Data

Mar. 15, 2013 (TW) .................................. 102109198

(51) Int. Cl.
*G02B 6/42* (2006.01)

(52) U.S. Cl.
CPC ............ *G02B 6/4214* (2013.01); *G02B 6/4206* (2013.01); *G02B 6/4212* (2013.01)

(58) Field of Classification Search
CPC ...................................................... G02B 6/4212
See application file for complete search history.

(56) References Cited

U.S. PATENT DOCUMENTS 7,985,026 B1 * 7/2011 Lin et al. .......................... 385/71
8,165,432 B2 * 4/2012 Ohta et al. ....................... 385/15

* cited by examiner

*Primary Examiner* — Jerry Rahll
(74) *Attorney, Agent, or Firm* — Novak Druce Connolly Bove + Quigg LLP

(57) ABSTRACT

An optical coupling element includes a first side surface and an upper surface. The upper surface defines a first cavity and a tapering hole which permits the insertion and precise fixing in place with adhesive of an optical fiber, without any gap or play in the attachment which would allow misalignment between the optical fiber and a light coupling lens.

12 Claims, 1 Drawing Sheet

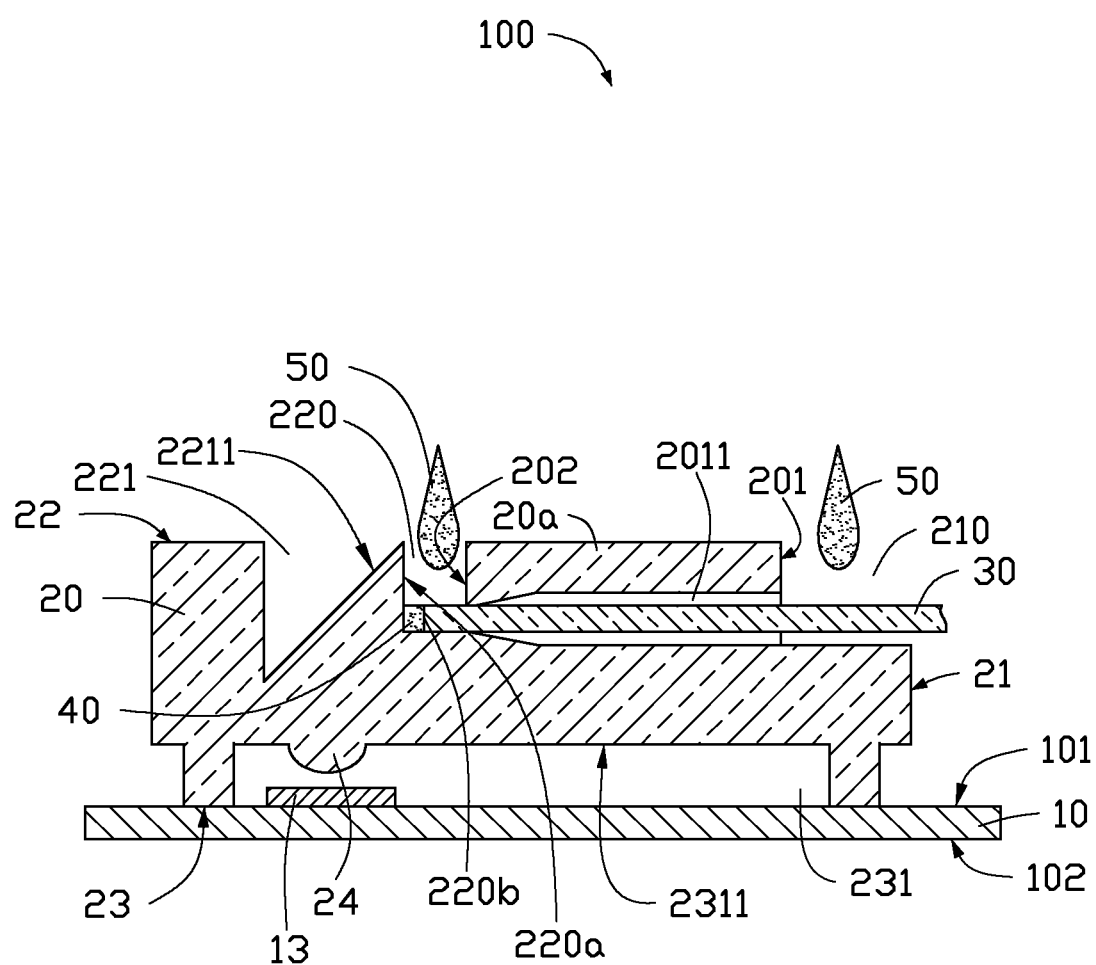

OPTICAL COUPLING ELEMENT AND OPTICAL FIBER CONNECTOR USING SAME

BACKGROUND

1. Technical Field

The present disclosure relates to an optical coupling element and an optical fiber connector using the same.

2. Description of Related Art

Optical fiber connectors typically include a blind hole behind a lens. The blind hole is configured to receive an optical fiber. The optical fiber inserted into the blind hole needs be fixed in place by adhesive. A typical method for adhering the optical fiber in the blind hole is to firstly insert an end of the optical fiber into the blind hole, and then to inject the adhesive in the opening of the blind hole while performing further insertion of the optical fiber into the blind hole to make the adhesive fill between a sidewall of the optical fiber and an inner wall of the blind hole, finally to insert the optical fiber further into the blind hole to accomplish the assembly process. However, this method costs time and does not permit the adhesive to completely surround the sidewall of the optical fiber. This may result in a weak adhesion of the optical fiber in the blind hole and more likely to allow the optical fiber to be misaligned with the optical axis of the lens.

Therefore, it is desirable to provide an optical coupling element and an optical fiber connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a cross-sectional view of an optical fiber connector, according to an exemplary embodiment.

DETAILED DESCRIPTION

The drawing shows an optical fiber connector 100, according to an embodiment. The optical fiber connector 100 includes a printed circuit board (PCB) 10, an optical coupling element 20 positioned on the PCB 10, an optical fiber 30 assembled into the optical coupling element 20, an optical adhesive 40 and a filling member 50.

The PCB 10 includes a supporting surface 101 and a rear surface 102 opposite to the supporting surface 101. A photoelectric conversion chip 13, which in the embodiment can be a laser diode or a photo diode, is positioned on the supporting surface 101. The PCB 10 contains various circuits (not shown) that connect with the photoelectric conversion chip 13.

The optical coupling element 20 includes a first side surface 21, an upper surface 22 and a lower surface 23 opposite to the upper surface 22. The upper surface 22 is substantially parallel with the lower surface 23. The first side surface 21 perpendicularly connects the upper surface 22 and the lower surface 23.

The optical coupling element 20 defines a recess 210 formed in a border of the upper surface 22 and the first side surfaces 21. The optical coupling element 20 also defines a first cavity 221 in the upper surface 22. The first cavity 221 includes a reflecting surface 2211. An included angle between the upper surface 22 and the reflecting surface 2211 is about 45 degrees. The upper surface 22 defines a blind hole 220 adjacent to the first cavity 221. The blind hole 220 includes a vertical surface 220a substantially perpendicular to the upper surface 22 and the lower surface 23.

The blind hole 220 and the first cavity 221 are spaced by a distance. A fixing portion 20a is formed between the blind hole 116 and the recess 210. The fixing portion 20a includes a first sidewall 201 and a second sidewall 202 away from the first sidewall 201. The first sidewall 201 communicates with the recess 210 and is opposite to the vertical surface 220a. The second sidewall 202 communicates with the blind hole 220. The blind hole 220 is located between the vertical surface 220a and the second sidewall 202. The fixing portion 20a defines a tapering hole 2011 extending through first sidewall 201 to the second sidewall 202. The tapering hole 2011 communicates with the blind hole 220 and the recess 210. A central axis of the tapering hole 2011 is substantially perpendicular to a central axis of the blind hole 220.

The optical coupling element 20 defines a receiving cavity 231 in the lower surface 23, a bottom surface 2311 of the first cavity 231 forms a light coupling lens 24. In the embodiment, the light coupling lens 24 is a convex lens integrally formed with the optical coupling element 20. The lower surface 23 is on the supporting surface 101 of the PCB 10, with the photoelectric conversion chip 13 being received in the receiving cavity 231, such that the light coupling lens 24 faces and aligns with the photoelectric conversion chip 13 and also aligns with the reflecting surface 2211. An included angle between the bottom surface 2311 and the reflecting surface 2211 is about 45 degrees. An included angle between an optical axis of the light coupling lens 24 and the reflecting surface 2211 is therefore about 45 degrees.

In the embodiment, the tapering hole 2011 is funnel-shaped. The tapering hole 2011 has a tapering portion adjacent to the second sidewall 210. The tapering portion is tapered along a far-to-near direction relative to the second sidewall 202. In the embodiment, a diameter of an end of the tapering hole 2011 close to the first sidewall 201 is larger than a diameter of the optical fiber 30, a diameter of the other end of the tapering hole 2011 close to the second sidewall 202 is equal to the diameter of the optical fiber 30. The optical fiber 30 is inserted into the tapering hole 2011, with an end of the optical fiber 30 being received in the blind hole 220. In the embodiment, the optical fiber 30 and the vertical surface 220a are spaced by a distance, as such, a receiving hole 220b is formed between the vertical surface 220a and the optical fiber 30.

In the embodiment, the optical adhesive 40 is an optically clear resin (OCR) adhesive. The optical adhesive 40 is filled into the receiving hole 220b to firmly attach the optical fiber 30 onto the vertical surface 220a without any gap or space.

After injecting the optical adhesive 40, both the blind hole 220 and the recess 210 are filled by the filling member 50. In the embodiment, the filling member 50 is adhesive cured by ultraviolet light (UV adhesive).

In use, when the photoelectric conversion chip 13 is a laser diode, light emitted from the photoelectric conversion chip 13 is directed into the optical coupling element 20 by the light coupling lens 24, and the light path is reflected about 90 degrees from the original path by the reflecting surface 2211. The light is thus finally reflected into the optical fiber 30 by the reflecting surface 2211. When the photoelectric conversion chip 13 is a photo diode, a process of the photo diode receiving light is the reverse of that of the laser diode emitting light.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical fiber connector, comprising:
a printed circuit board (PCB) comprising a supporting surface and a photoelectric conversion chip positioned on the supporting surface and electrically connected to the PCB;
an optical coupling element positioned on the PCB, the optical coupling element comprising:
a first side surface;
an upper surface connected to the first side surface, the upper surface defining a first cavity; wherein the optical coupling element defines a recess in a border of the upper surface and the first side surfaces, the upper surface defines a blind hole adjacent to the first cavity, the blind hole and the first cavity are spaced by a distance, a fixing portion is formed between the blind hole and the recess, the fixing portion defines a tapering hole communicating with the blind hole and the recess, the blind hole comprises an vertical surface, the fixing portion comprises a first sidewall and a second sidewall opposite to the first sidewall, the tapering hole passes through the first sidewall and the second sidewall, the first sidewall communicates with the recesses and opposite to the vertical surface, and the second sidewall communicating with the blind hole;
an optical fiber inserted into the tapering hole with an end of the optical fiber received in the blind hole, the optical fiber and the vertical surface of the blind hole spaced by a distance, a receiving hole defined between the vertical surface and the optical fiber; and
an optical adhesive filled into the receiving hole to firmly attach the optical fiber onto the vertical surface without any gap or space.

2. The optical fiber connector of claim 1, wherein the optical coupling element further comprises a lower surface, the lower surface opposite to the upper surface, the lower surface defines a receiving cavity, the receiving cavity comprises a bottom surface, and the bottom surface forms a light coupling lens.

3. The optical fiber connector of claim 2, wherein the photoelectric conversion chip is received in the receiving cavity.

4. The optical fiber connector of claim 2, wherein the upper surface is substantially parallel with the lower surface.

5. The optical coupling element of claim 2, wherein the first cavity comprises a reflecting surface, an included angle between the upper surface and the reflecting surface is about 45 degrees, the light coupling lens aligns with the reflecting surface, an included angle between an optical axis of the light coupling lens and the reflecting surface is about 45 degrees.

6. The optical fiber connector of claim 2, wherein the light coupling lens is convex lens and is integrally formed with the optical coupling element.

7. The optical fiber connector of claim 1, wherein a central axis of the tapering hole is substantially perpendicular to a central axis of the blind hole.

8. The optical fiber connector of claim 1, wherein the tapering hole is funnel-shaped, a diameter of an end of the tapering hole close to the first sidewall is larger than a diameter of the optical fiber, and a diameter of the other end of the tapering hole close to the second sidewall is equal to the diameter of the optical fiber.

9. The optical fiber connector of claim 1, wherein the photoelectric conversion chip is a laser diode or a photo diode.

10. The optical fiber connector of claim 1, wherein the optical adhesive is an optical clear resin adhesive.

11. The optical fiber connector of claim 1, further comprises a filling member, wherein both the blind hole and the recesses are filled by the filling member.

12. The optical fiber connector of claim 11, wherein the filling member is adhesive cured by ultraviolet light.

* * * * *